P. H. SEERY.
AXLE BRACING FIXTURE.
APPLICATION FILED MAR. 10, 1919.

1,322,063.

Patented Nov. 18, 1919.

INVENTOR
Peter H. Seery,
BY
Wm H Camfield.
ATTORNEY.

UNITED STATES PATENT OFFICE.

PETER H. SEERY, OF NEWARK, NEW JERSEY.

AXLE-BRACING FIXTURE.

1,322,063.   Specification of Letters Patent.   Patented Nov. 18, 1919.

Application filed March 10, 1919. Serial No. 281,615.

*To all whom it may concern:*

Be it known that I, PETER H. SEERY, a citizen of the United States, and a resident of Newark, county of Essex, and State of New Jersey, have invented certain new and useful Improvements in Axle-Bracing Fixtures, of which the following is a specification.

This invention relates to an improved brace for axles, and is designed particularly for bracing the axles of a Ford car, although it can be slightly modified to fit other situations.

This invention is also applicable as a repair fixture, since the converging ends of the tubes which brace the axle, particularly the front axle, very often break, and part of the present structure can be inserted therein, since it is removable and detachable at will.

The present invention is designed to provide a structure that minimizes the breaking of the rods that brace the axle, is entirely free from welding and brazing, and there are other advantages which will be evident from a consideration of the specification and claims.

Figure 1:
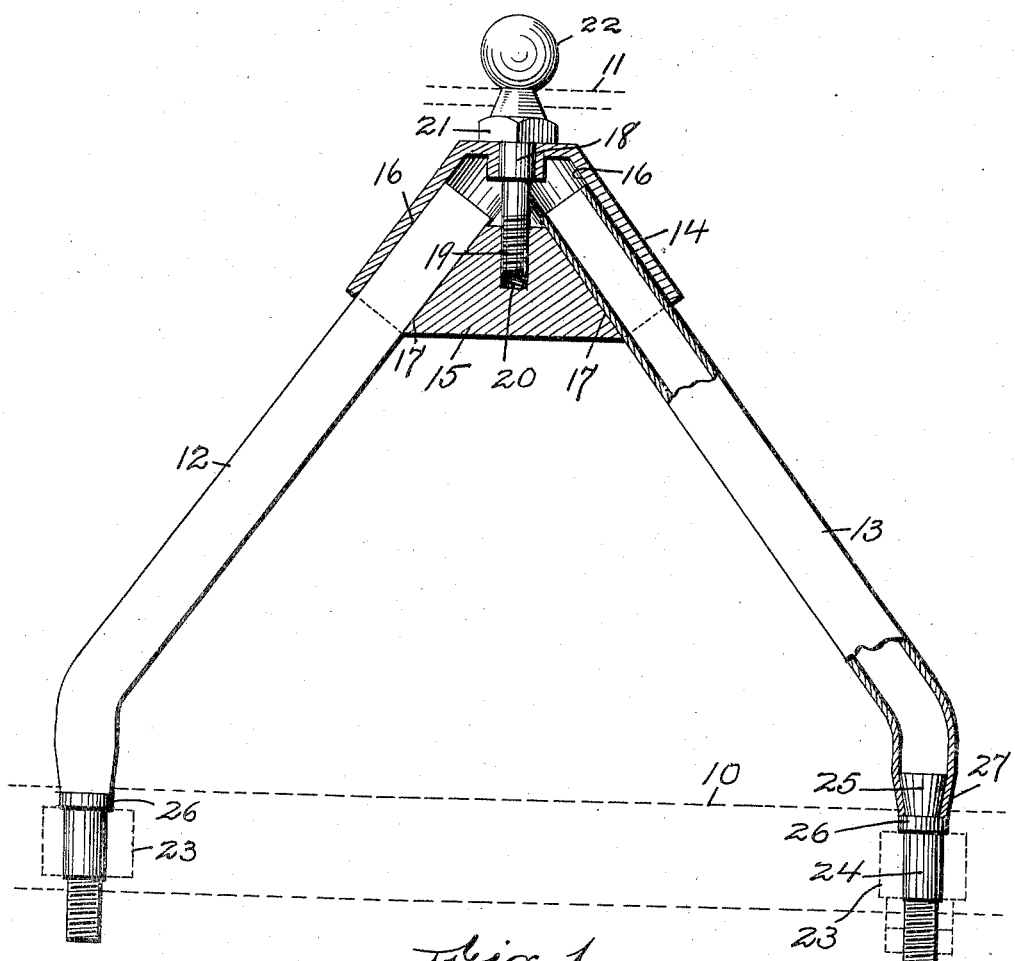
Figure 2:
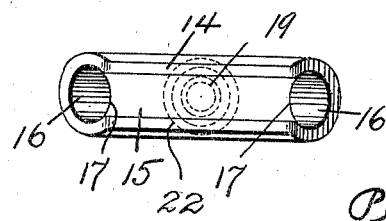

The invention is illustrated in the accompanying drawing, in which Figure 1 is a top view of the device with the bracket part and one of the ends of one of the tubes being broken away so as to more clearly illustrate the structure. Fig. 2 is an end view of the bracket removed from the tubes.

To make the device clearly understood I describe it as applied to a Ford car, parts of which are illustrated in the drawing, 10 indicating the axle, and 11 one wall of the gear case, which is in rear of the front axle, although it may be any other element on the car from which the front axle is braced, the bracing being in the form of tubes or bars, the illustration showing tubes 12 and 13, these being usually divergent toward the front and being fastened to a suitable support and also to the axle, and when brazed or welded, breakage often results under shocks or heavy loads. On the converging ends of these divergent tubes I arrange a bracket, which consists of two members, a shell member 14 and a wedge member 15, the shell member 14 having its inner walls 16 at the side arranged to fit against the tubes 12 and 13, and the wedge member has its outer faces or walls 17, which are opposed to the walls 16, adapted to fit the inner faces of the tubes so that the walls 16 and 17 between them are adapted to clamp the converging ends of the divergent tubes 12 and 13, and in order to securely fasten them tightly in place I provide a means for forcing the two members toward each other.

The form shown consists of a bolt 18 which has its end 19 screw-threaded and screwed into a recess 20 in the member 15, and also has a head 21 bearing on the outer side at the end of the shell member 14.

It will thus be seen that when the screw is turned in one direction it pulls on the wedge and pushes on the shell member and so forces them in tight engagement with the tubes. On the projecting end of the bracket I arrange suitable means for securing it to a support, and in the form shown a ball 22 is arranged within the wall 11 of the gear case and this has a slight rocking or tilting movement relative to the gear case.

It will also be evident that in case of breakage, with ordinary welding of the converging ends of the tubes, which is sometimes done in automobiles, this bracket can be placed on the broken ends of the tubes and used to securely hold them in position.

The divergent ends of the tubes 12 and 13 are fastened to the axle 10 by suitable clips 23, into which are fastened the studs 24, on the ends of which are the wedge-shaped plugs 25, which fit in the ends of the tubes, each plug being wider on the end that is farthest in the tube and narrower on the outer end, and is preferably provided with a collar 26, against which the end of the tube fits. The part 27 of the tube, which is around the plug, is swaged so as to tightly fit the plug, does not pull out, forms a neat finish, is stable and does not necessarily require welding or brazing. This form of axle brace, comprising divergent tubes with its bracket on one end and the means for attaching it to the axle on the other end, is without welding, can be used as a repair fixture, is economical and can be attached quickly.

I claim:

1. An axle bracing fixture comprising divergent tubes, a bracket comprising a shell member with inside divergent walls to receive the tubes, a wedge member to fit between the tubes, and means for forcing the members toward each other.

2. An axle bracing fixture comprising divergent tubes, a bracket having means for supporting it and comprising a shell member and a wedge member for clamping the ends of the tubes between them, and means connecting the members for causing them to clamp the tubes.

3. An axle bracing fixture comprising a bracket having a shell member with divergent inner walls and a wedge member with divergent outer faces, tubes having their ends arranged between the said members so that they can be clamped in divergent position, and means connecting the members for drawing them together to clamp the tubes, said last mentioned means having an element thereon whereby it can be secured to a support.

4. An axle bracing fixture comprising a bracket having a shell member with divergent inner walls and a wedge member with divergent outer faces, tubes having their ends arranged between the said members so that they can be clamped in divergent position, means connecting the members for drawing them together to clamp the tubes, said last mentioned means having an element thereon whereby it can be secured to a support, and studs at the outer ends of the divergent tubes, said studs having tapered ends within the tubes, the narrower end of the taper being at the outer end of the tube, said tubes having reduced diameters at their extremities to fit the wedges.

5. An axle bracing fixture comprising a pair of divergent tubes, a bracket, consisting of two members, a shell member and a wedge member fitting within the shell member, the two members having their opposed faces constructed so as to receive the ends of the divergent tubes, a headed screw passing through the shell member and in screw-threaded engagement with the wedge member, means on the projecting end of the screw for securing it to a support, and means on the divergent ends of the tubes for securing them to an axle.

6. An axle bracing fixture comprising a pair of divergent tubes, a bracket, consisting of two members, a shell member and a wedge member fitting within the shell member, the two members having their opposed faces constructed so as to receive the ends of the divergent tubes, a headed screw passing through the shell member and in screw-threaded engagement with the wedge member, means on the projecting end of the screw for securing it to a support, and means for securing the divergent ends of the tubes to an axle, said means comprising studs having on their inner ends tapered plugs with the larger end of the taper at the outer end of the plug, said tubes closely fitting said tapered plugs.

7. In an axle brace, a bracket comprising a shell member with its inner walls adapted to position divergent tubes, a wedge member to fit between the tubes and within the bracket, a screw bearing on the outside of the shell and in screw-threaded engagement with the wedge to force the members toward each other, and means on the outer end of the screw for attaching it to a support.

8. In an axle brace, a bracket comprising a shell member with its inner walls adapted to position divergent tubes, a wedge member to fit between the tubes and within the bracket, a screw bearing on the outside of the shell and in screw-threaded engagement with the wedge to force the members toward each other, and a ball arranged on the projecting end of the screw.

9. In an axle brace, a bracket comprising a shell member with its inner walls adapted to position divergent tubes, a wedge member to fit between the tubes and within the bracket, and a screw bearing on the outside of the shell and in screw-threaded engagement with the wedge to force the members toward each other.

In testimony that I claim the foregoing, I have hereto set my hand, this 7th day of March, 1919.

PETER H. SEERY.